United States Patent

Nilssen

[15] 3,699,817

[45] Oct. 24, 1972

[54] ISOLATOR WASHER MEANS FOR PUSHBUTTON TUNER MEMORY MECHANISM

[72] Inventor: Ole K. Nilssen, Barrington Hills, Ill.

[73] Assignee: Motorola, Inc., Franklin Park, Ill.

[22] Filed: Dec. 9, 1970

[21] Appl. No.: 96,553

[52] U.S. Cl. ....................................74/10.37, 334/7

[51] Int. Cl. ............................................F16h 35/18

[58] Field of Search....74/10.37, 10.35, 10.31, 10.29, 74/10; 334/7

[56] References Cited

UNITED STATES PATENTS

| | | | |
|---|---|---|---|
| 2,285,247 | 6/1942 | Zapp | 74/10.37 |
| 2,288,098 | 6/1942 | Marholz et al | 74/10.37 |

*Primary Examiner*—Milton Kaufman
*Attorney*—Mueller & Aichele

[57] ABSTRACT

An isolator washer for a mechanical memory mechanism for a radio tuner or the like having a plurality of memory cams positioned at axially spaced locations in a common shaft. The shaft is rotated by actuation of a pushbutton which has a portion thereof engaging one of the memory cams to tune the radio to a desired preselected radio station. A common lock mechanism is used to simultaneously unlock all the memory cams on the shaft to a minimum per load holding force, and isolator washer means is positioned next to each memory cam to prevent rotational movement of a memory cam then being set from inadvertently rotating an adjacent memory cam which is not to be moved. The memory cam so being set is moved only under the influence of a setting action by its associated pushbutton.

3 Claims, 6 Drawing Figures

PATENTED OCT 24 1972 3,699,817

INVENTOR.
OLE K. NILSSEN

BY Mueller & Aichele
ATTORNEYS.

ISOLATOR WASHER MEANS FOR PUSHBUTTON TUNER MEMORY MECHANISM

BACKGROUND OF THE INVENTION

This invention relates generally to pushbutton tuning mechanisms for radio receivers, and more particularly to an improved locking device for use in setting and resetting an adjustable pushbutton structure to permit selection of any one of a predetermined group of given stations.

In pushbutton radio tuners of the type heretofore provided for use in automobiles, it is common to have an adjustable cam member supported on each one of a plurality of slidably mounted plunger rods to which the pushbutton is connected. The cam member, when in a locked condition, engages a treadle bar structure which includes a pair of parallel members mounted on a movable carriage and coupled to the tuning element or elements of the radio receiver to manipulate the same and tune the radio. In such mechanism, the cam member is locked at a certain angle on the associated pushbutton plunger rod so that as the rod is removed, with respect to the parallel bars of the treadle structure, it brings the bars into alignment with outwardly extended surfaces of the cam member. This sets the carriage and the resonant circuits of the radio tuner to a proper preselected position thus corresponding to a preselected radio station. However, this type of radio pushbutton tuner is rather complicated and expensive to manufacture.

SUMMARY OF THE INVENTION

Accordingly, it is a general object of this invention to provide an improved cam locking mechanism for setting and resetting selected ones of a group of radio stations on a pushbutton tuner.

Another general object of this invention is to provide an improved pushbutton tuner assembly which is simple in construction, inexpensive to manufacture and requires less assembly time so as to reduce labor costs.

Yet another and more specific object of this invention is to provide an improved isolator washer means for use in a common lock, pushbutton cam memory mechanism.

Briefly, the tuning mechanism of this invention includes a common rotating shaft which replaces the old fashion treadle bar assembly of the prior art, and which has a number of memory plates or cams attached thereto and locked in position at longitudinally spaced locations on the shaft. The cams are attached to the shaft in such manner that when a common locking device is unlocked any one cam can be rotated against a predetermined friction without affecting the position of the other cams on the shaft, thus setting or resetting a given cam to a desired radio station without upsetting the positions of the other cams. A locking device may be provided at one end of the shaft to operate in such a manner that when the locking device is in its "ON" condition, it locks all the cams in a fixed position on THE SHAFT, AND IN ITS "OFF" condition, it unlocks all the cams except for a small preload force, so that selected ones can be rotated against a given amount of friction while being moved to a new set position without affecting the position of other cams. A forked shaped pushbutton slide member is attached to the pushbutton and is actuated by pressing the pushbutton inward to have the extended forked portions thereof engage radially outwardly extending cam surfaces of an associated memory cam member positioned directly behind and in alignment with the pushbutton. The rotating shaft can have an infinite number of relative angular positions with respect to any memory cam fastened thereto. The same pushbutton forked member is used to set the cam on the shaft, when it is in an unlocked condition, as is used to reset the cam, when it is in a locked condition. That is, setting of the cam takes place with the clamping or locking device in an "OFF" condition and sufficient frictional holding force is provided between the memory cam and the isolator washer means of this invention. The isolator washer means is located adjacent each of the cams so that only the cam which is being set by the forked slide member is rotated to a new position. Also, the isolator washer means is slightly flexible in the axial direction and may exert a slight axial pressure on the adjacent cam and is secured to the shaft to prevent rotational motion so that the adjacent spacer is prevented from movement during this setting operation. Resetting of the cam takes place with the clamping or locking device in an "ON" condition at which time the whole shaft turns. The locking mechanism exerts a considerable amount of force, in the order of 120 pounds or so, axially against each of the cams and spacers to lock them in a fixed position on the shaft while the slight holding force is in the order of about 5 pounds to allow easy setting of the desired cam.

DESCRIPTION OF THE PREFERRED EMBODIMENT

Figures 1, 2, 3, 4, 5, 6:
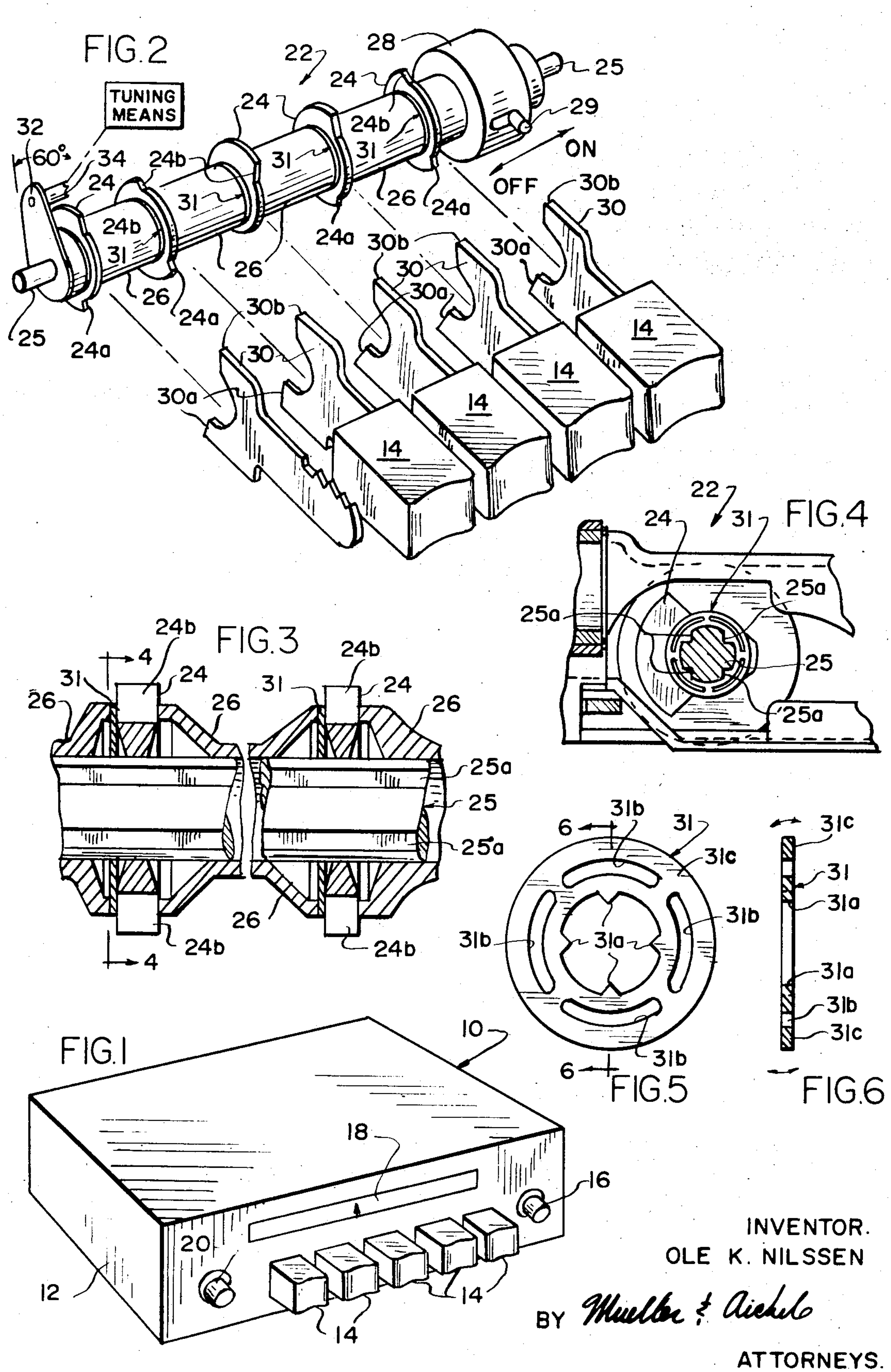
FIG. 1 is a perspective view of a radio tuner of the pushbutton type utilizing memory cams on a common shaft with a common lock mechanism for holding and releasing all of the memory cams simultaneously.
FIG. 2 is an exploded fragmentary, perspective view of the memory cams on the shaft with a common lock mechanism associated therewith and showing pushbuttons for operating the same.
FIG. 3 is an enlarged fragmentary, sectional view of the memory cams on a shaft and showing the position of the isolator washer means of this invention adjacent their associated memory cams.
FIG. 4 is a sectional side view taken along line 4—4 of FIG. 3 showing the relationship of the pushbutton cam mechanism of this invention.
FIGS. 5 and 6 illustrate the detailed construction of the illustrated embodiment of the isolator washer device of this invention.

Throughout the following detailed description it will be understood that the like reference numerals on the various figures of the drawings are intended to designate similar elements or components. Referring now to FIG. 1, there is seen a pushbutton radio designated generally by reference number 10 and having a housing 12 from which extend a plurality of pushbuttons 14 to be manipulated by pressing a selected one thereof to actuate or move a tuning mechanism within the housing 12 for setting or recalling a preselected ratio station. Full manual tuning operation may be accomplished by a knob 16 in the conventional manner such that when the manual tuning means so used is clutched in and out of engagement when the pushbutton mechanism is actuated to reduce the load against which the pushbutton must be pushed. The radio station selected will be indicated on an indicator dial assembly 18 in the usual manner, and there is also provided an ON-OFF and volume control knob 20, which may include tone control means, if desired.

In FIG. 2 there is seen the illustrated embodiment of a common lock and memory cam device wherein the isolator washer means of this invention is most advantageously incorporated. The memory cam device can be used for pushbutton radios and is herein designated generally by reference numeral 22. The memory device 22 includes a plurality of memory cams 24 preferably at equally spaced apart locations on a shaft 25 and separated thereon by cylindrical spacers 26. At one end of the shaft 25 is located a common locking mechanism designated generally by reference numeral 28 and which includes a lever 29 movable between OFF and ON positions as indicated by the double arrowed lines labeled OFF and ON, respectively. The specific details of the locking mechanism 28 are shown in application Ser. No. 80,295, filed Oct. 13, 1970 now U.S. Pat. No. 3,667,302 and assigned to the same assignee.

With the common locking mechanism 28 in the ON or lock position, all of the memory cams 24 are locked in position on the shaft 25 and they are non-movable relative thereto. Upon actuation of any of the pushbuttons 14, an associated rearwardly extended member 30 will engage the memory cam 24 which is in alignment therewith and rotate the shaft 25 about its axis, which in turn, will move a lever or arm 32 and an associated bar 34 which is connected in the usual manner to the tuning coils of the radio, not shown. This rotation is through a limited arc in the order of about 60°or so, which is its maximum movement of the bar 34. Rotation of the shaft 25 will continue until the radially outwardly cam surfaces **24*a* and 24*b* both engage the spaced apart fork-like portions 30*a* and 30*b*, respectively, of the member 30 and at this point rotation of the shaft 25 will stop regardless of any further pressure applied to the pushbutton 14**.

In accordance with this invention, a plurality of isolator washers 31 are positioned on the shaft 25, and each isolator washer 31 is located adjacent a memory cam 24. In other words, each isolator washer 31 is positioned between an associated memory cam 24 and a spacer 26 to isolate one from the other and to isolate one cam from another cam during the setting of the memory cam to a new position on the shaft 25. Thus, when a pushbutton 14 is pressed rearwardly to set one of the memory cams 24 to a new position, rotation of the memory cam so selected will not cause rotation of any of the memory cams not being selected.

Referring now to FIGS. 3 and 4, there is seen an enlarged sectional, detailed view of the illustrated memory cam device 22 wherein the isolator washer of this invention, which is made of spring steel, for instance is most advantageously used. The spacing between the respective memory cams 24 is determined by the axial extent of the associated spacers 26 and the thickness of the isolator washer 31 which are positioned between the memory cams. The shaft 25 has four splines **25*a* formed therein, and conformably shaped, radially inward tabs 31*a* on the isolator washer 31 firmly engage these splines to be held in place on the shaft in a substantially fixed position. With the locking mechanism 28 in the unlocked or OFF condition, the memory cams 24 are held in place by a slight preload holding force exerted thereon by the locking mechanism. That is, the locking force of the mechanism 28 is in the order of 120 to 150 pounds while the preload holding force is in the order of 5 pounds or so. The isolator washers are axially flexible at their periphery to be sufficiently axial movable toward and away from the memory cams so that they will no oppose the locking force exerted by the mechanism 28. The tabs 31*a* engaging the splines 25*a* prevent the isolator washer from torsional movement on the shaft 25. In the unlocked condition of the locking mechanism 28, it will be noted that all of the memory cams simultaneously are unlocked but held by the preloading force of 5 pounds and only the selected one is set to a new position and the remaining memory cams are unaffected by the setting operation. Therefore, by providing this improved isolator washer 31 on one side of the memory cam, or on both sides thereof, if desired, rotational isolation is obtained so that the non-selected memory cams 24 will not inadvertently move on the shaft 25**.

FIG. 4 illustrates a side view of an isolator washer in position on the shaft 25 of pushbutton mechanism 22 to show a few details of the assembly. Here, the shaft 25 and the splines or grooves **25*a* are shown 90°apart so as to receive correspondingly displaced tabs 31*a* on the isolator washer 31. The tabs 31*a* fit tightly within the splines 25*a* and thus hold the isolator washer from free axial movement. That is, the isolator washer 31 fits tightly on the shaft and is held in position during normal operation so that slight resilient movement in the axial direction can take place. This slight axial resilient movement allows the locking force from the locking mechanism 28 to be transmitted to the individual memory cams when the locking mechanism 28 is in the ON condition. On the other hand, the tabs 31*a*, which fit into the grooves 25*a***, prevent any rotational movement of the isolator washer and, as such, no rotational movement can be transmitted to an adjacent memory cam during setting of any cam.

Referring now to FIGS. 5 and 6, the detailed configuration of the isolator washer 31 is here shown. The radially inward tabs **31*a* are spaced apart 90°from one another and may be fashioned to fit tightly within the splines 25*a* of the shaft 25, it being understood that only one such tab 31*a* is necessary to prevent rotation on the shaft 25. To ensure ease of flexibility in the axial direction, four struck-out portions 31*b* are formed radially about the isolator washer, and are here illustrated as being in the same quadrants as the tabs 31*a*. However, it will be understood that the struck-out portions 31*b* can be located in any position about the periphery of the washer, and the number of such struck-out portions may vary from two or more. The material existing between the struck-out portions 31*b* is sufficiently thin to allow slight laterial or axial movement of the peripheral portion 31*c* without causing movement of the inner portion. The peripheral portion 31*c* of the isolator washer 31 is of most importance as it is this portion which actually isolates arcuate movement of the memory cam 24 from the spacer 26 as for example, through 60°of rotation of the arm 32 as seen in FIG. 2. This 60°of rotation of the arc 32 is the maximum amount of rotation of the shaft 25 to move the tuning mechanism through its entire range of positions. Referring back to FIG. 3, it can be seen that the bell-shaped end of the spacer 26 engages the periphery 31***c*, and preferably no other parts of these components come in contact. Thus the arm 32 and link 34 will arcuately adjust the tuning means connected thereto.

What has been described is a simple, efficient isolator washer to be positioned on a shaft adjacent a corresponding one of a plurality of memory cams to prevent such memory cams, when rotated from causing rotation of any other adjacent memory cams.

I claim:

1. A mechanical memory positioning mechanism comprising, in combination, a shaft to be selectively arcuately positioned within a given range of positions, a plurality of memory cams selectively locked in position on said shaft at axially spaced apart locations thereon, pushbutton means supported in spaced relation with respect to said plurality of memory cams to be actuated, each of said pushbutton means having a portion thereof extending toward a respective associated memory cam for engaging the same to rotate said shaft about its axis to a position predetermined by said cam upon actuation of said pushbutton means, unlocking means for releasing all of the cams on the said shaft from a locked condition for resetting the same by engagement of an associated pushbutton means, and isolator washer means comprising a circular washer having radially inwardly extending gripping tabs engaging corresponding slots on said shaft and further including arcuately struck-out segments at a radial location intermediate said tabs and the outer periphery of said isolator washer means, wherein the material existing between the struck-out portion forms flexible portions to permit slight axial movement of the periphery of the circular washer when said unlocking mechanism is unlocked and all of said memory cams are in an unlocked condition on said shaft, said circular washer adjacent each of said memory cams to permit changing the position of a selected one of said memory cams without affecting movement of other non-selected memory cams when said unlocking means is unlocked and said selected one of said cams is being reset by said associated pushbutton means.

2. The mechanical memory positioning mechanism of claim 1 wherein said circular washer is spring steel.

3. In a radio receiver having frequency tuner means and pushbuttons to be actuated to set and thereafter recall preselected frequencies of the tuner means to receive given radio stations, the combination including, a housing in which the tuner means is mounted, a shaft mounted in said housing, means adapted to be connected between said shaft and said tuner means to cause tuning thereof in response to rotation of said shaft about its axis within a limited arcuate movement, a plurality of memory cams locked in position at spaced locations on said shaft, pushbutton means extending from said housing to be actuated, each pushbutton means having a portion thereof extending into said housing to engage a respective one of said memory cams and rotate said shaft about its axis upon actuation of said pushbutton means, unlocking means for simultaneously unlocking said plurality of memory cams on said shaft, and isolator washer means comprising a circular washer having at least one pair of diametrically opposed radially inwardly extending gripping tabs engaging corresponding slots formed on said shaft and further including arcuately shaped struck-out segments at a radial location intermediate said tabs and the periphery thereof, and wherein the material existing between the struck-out portions forms flexible portions to permit slight axial movement of the periphery of said circular washer, in the axial direction when said unlocking mechanism is off and all of said cams are in an unlocked condition on said shaft, said circular washer on said shaft adjacent each of said memory cams to permit changing the position of a selected one or ones of said memory cams without affecting movement of other non-selected memory cams on said shaft when a new frequency of the tuner means is being set.

* * * * *